United States Patent
Shih et al.

(10) Patent No.: US 7,649,664 B1
(45) Date of Patent: Jan. 19, 2010

(54) TWO-ELEMENT F-θ LENS USED FOR MICRO-ELECTRO MECHANICAL SYSTEM (MEMS) LASER SCANNING UNIT

(75) Inventors: Bo-Yuan Shih, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/424,416

(22) Filed: Apr. 15, 2009

(30) Foreign Application Priority Data

Sep. 23, 2008 (TW) .............................. 97136555 A

(51) Int. Cl.
G02B 26/08 (2006.01)
(52) U.S. Cl. ................ 359/206.1; 359/207.3; 359/215.1
(58) Field of Classification Search ... 359/206.1–207.6, 359/213.1–215.1, 662
See application file for complete search history.

(56) References Cited

U.S. PATENT DOCUMENTS

| | | | | |
|---|---|---|---|---|
| 5,111,325 | A * | 5/1992 | DeJager | 359/206.1 |
| 5,287,125 | A * | 2/1994 | Appel et al. | 347/259 |
| 6,295,116 | B1 | 9/2001 | Eom | |
| 6,377,293 | B2 | 4/2002 | Koh et al. | |
| 6,844,951 | B2 | 1/2005 | Cannon et al. | |
| 6,956,597 | B2 | 10/2005 | Bush et al. | |
| 7,064,876 | B2 | 6/2006 | Cannon et al. | |
| 7,079,171 | B2 | 7/2006 | Sung et al. | |
| 7,184,187 | B2 | 2/2007 | Cannon et al. | |
| 7,190,499 | B2 | 3/2007 | Deng et al. | |
| 2006/0113393 | A1 | 6/2006 | Herwig et al. | |
| 2007/0121187 | A1 * | 5/2007 | Okamura | 359/207 |

FOREIGN PATENT DOCUMENTS

| | | |
|---|---|---|
| JP | 2006-201350 | 8/2006 |
| TW | I198966 | 1/1993 |
| TW | M253133 | 12/2004 |

OTHER PUBLICATIONS

English abstract of JP2006201350.

* cited by examiner

Primary Examiner—James Phan
(74) Attorney, Agent, or Firm—WPAT, P.C.; Anthony King

(57) ABSTRACT

A two-element f-θ lens used for a micro-electro mechanical system (MEMS) laser scanning unit includes a first lens and a second lens, the first lens is a bi-convex lens and the second lens is a bi-convex lens. At least one optical surface is an Aspherical surface in both main scanning direction and sub scanning direction, and satisfies special optical conditions. The two-element f-θ lens corrects the nonlinear relationship between scanned angle and the time into the linear relationship between the image spot distances and the time. Meanwhile, the two-element f-θ lens focuses the scan light to the target in the main scanning and sun scanning directions, such that the purpose of the scanning linearity effect and the high resolution scanning can be achieved.

5 Claims, 11 Drawing Sheets

TWO-ELEMENT F-θ LENS USED FOR MICRO-ELECTRO MECHANICAL SYSTEM (MEMS) LASER SCANNING UNIT

BACKGROUND OF THE INVENTION

1. Field of the Invention

The present invention relates to a two-element fθ lens of a micro-electro mechanical system (MEMS) laser scanning unit, and more particularly to a two-element fθ lens using an angular change varied with time in a sinusoidal relation for correcting a MEMS reflecting mirror having a simple harmonic motion to achieve a scanning linearity effect required by the laser scanning unit.

2. Description of the Related Art

At present, a laser scanning unit (LSU) used by a laser beam printer (LBP) controls a laser beam scanning by a high-speed rotating polygon mirror as disclosed in U.S. Pat. Nos. 7,079,171, 6,377,293 and 6,295,116 or TW Pat. No. I198966, and the principles of their operation are described below: a semiconductor laser emits a laser beam through a collimator and an aperture to form parallel beams. After the parallel beams pass through a cylindrical lens, the beams are focused at the width of the Y-axis in a sub scanning direction and along a direction parallel to the X-axis of a main scanning direction to form a line image and projected onto the high-speed rotating polygon mirror. The polygon mirror includes a plurality of continuous reflecting mirrors disposed substantially at or proximate to the focus position of the line image. The polygon mirror is provided for controlling the direction of projecting the laser beam, so that when a plurality of continuous reflecting mirrors are rotated at a high speed, the laser beam projected onto a reflecting mirror can be extended in a direction parallel to the main scanning direction (x-axis) at the same angular velocity and deviated from and reflected onto a fθ linear scanning lens. The fθ linear scanning lens is installed next to the polygon mirror and can be either a single-element lens structure (or a single scanning lens) or a two-element lens structure. The function of this fθ linear scanning lens is to focus a laser beam reflected by the reflecting mirror of the polygon mirror and projected onto the fθ lens into an oval spot that is projected onto a photoreceptor (or a photoreceptor drum, which is an image side) to achieve the requirement of the scanning linearity. However, the traditional laser scanning unit LSU still has the following drawbacks in its practical application:

(1) The manufacture of the rotating polygon mirror incurs a high level of difficulty and a high cost, and thus increasing the manufacturing cost of the LSU.

(2) The polygon mirror requires a high-speed rotation (such as 40000 rpm) and a high precision, and thus a cylindrical lens is required to be installed to the traditional LSU since the width of a general polygon mirror along the Y-axis of the reflecting surface of the mirror is very thin, so that the laser beams passing through the cylindrical lens can be focused to a line (or a spot on the Y-axis) and projected onto the reflecting mirror of the polygon mirror. This arrangement increases the number of components and also complicates the assembling operation procedure.

(3) The traditional polygon mirror requires a high-speed rotation (such as 40000 rpm), and thus the noise level is raised. Furthermore, the polygon mirror takes a longer time to accelerate from a starting speed to a working speed, and thus increasing the wait time of turning on the laser scanner.

(4) In the assembly of the traditional LSU, the central axis of a laser beam projected onto the reflecting mirror of the polygon mirror is not aligned precisely with the central rotating axis of the polygon mirror, so that it is necessary to take the off axis deviation of the polygon mirror into consideration to design the fθ lens, and thus making the design and the manufacture of the fθ lens more complicated.

In recent years, an oscillatory MEMS reflecting mirror is introduced to overcome the shortcomings of the traditional LSU assembly and replace the laser beam scanning controlled by the traditional polygon mirror. The surface of a torsion oscillator of the MEMS reflecting mirror has a reflecting layer for reflecting the light by oscillating the reflecting layer for the scanning. In the future, such arrangement will be applied in a laser scanning unit (LSU) of an imaging system, a scanner or a laser printer, and its scanning efficiency is higher than the traditional rotating polygon mirror. As disclosed in U.S. Pat. Nos. 6,844,951 and 6,956,597, at least one driving signal is generated, and its driving frequency is close to the resonant frequency of a plurality of MEMS reflecting mirrors, and the driving signal drives the MEMS reflecting mirror to produce a scanning path. In U.S. Pat. Nos. 7,064,876, 7,184,187, 7,190,499, US2006/0113393, or TW Pat. No. M253133, or JP Pat. No. 2006-201350, a MEMS reflecting mirror installed between a collimator and a fθ lens of a LSU module replaces the traditional rotating polygon mirror for controlling the projecting direction of a laser beam. The MEMS reflecting mirror features the advantages of small components, fast rotation, and low manufacturing cost. However, after the MEMS reflecting mirror is driven by the received voltage for a simple harmonic motion with a sinusoidal relation of time and angular speed, a laser beam projected on the MEMS reflecting mirror is reflected with a relation of reflecting angle θ and time t as follows:

$$\theta(t)=\theta_s \cdot \sin(2\pi \cdot f \cdot t) \qquad (1)$$

where, f is the scanning frequency of the MEMS reflecting mirror, and $\theta_s$ is the maximum scanning angle at a single edge after the laser beam passes through the MEMS reflecting mirror.

In the same time interval Δt, the corresponding variation of the reflecting angle is not the same but decreasing, and thus constituting a sinusoidal relation with time. In other words, the variation of the reflecting angle in the same time interval Δt is $\Delta\theta(t)=\theta_s \cdot (\sin(2\pi \cdot f \cdot t_1)-\sin(2\pi \cdot f \cdot t_2))$, which constitutes a non-linear relation with time. If the reflected light is projected onto the target from a different angle, the distance from the spot will be different in the same time interval due to the different angle.

If the moving angle of the MEMS reflecting mirror is situated at a peak or a valley of a sine wave, the angular change will vary with time, which is different from the motion of a traditional polygon mirror at a constant angular velocity. If a traditional fθ lens is installed onto a laser scanning unit (LSU) of the MEMS reflecting mirror, the angular change produced by the MEMS reflecting mirror cannot be corrected, and the speed of the laser beams projected on an image side will be an uniform speed scanning, and the image on the image side will be deviated. Therefore, the laser scanning unit or the MEMS laser scanning unit (MEMS LSU) composed of MEMS reflecting mirrors has a characteristic that scan lights at different angles are formed in the same time interval after the laser beam is scanned by the MEMS reflecting mirror.

As disclosed in U.S. Pat. No. 7,184,187, provided a polynomial surface for fθ lens to adjust the angular velocity variation in the main-scanning direction only. However, the laser light beam is essential an oval-like shape of the cross section that corrects the scan lights in the main-scanning direction only may not be achieve the accuracy requirement. Since, a fθ lens with main-scanning direction correcting as well as sub-scanning direction correcting demands immediate attentions and feasible solutions.

SUMMARY OF THE INVENTION

Therefore, it is a primary objective of the present invention to provide a two-element fθ lens used for a MEMS laser scanning unit, and the two-element fθ lens is comprised of a first lens in a bi-convex shape and a second lens in a bi-convex shape counted sequentially from the MEMS reflecting mirror for projecting a scan light reflected by the MEMS reflecting mirror onto a target to form a correct image and achieve a scanning linearity effect required by the laser scanning unit.

Another objective of the present invention is to provide a two-element fθ lens used for a MEMS laser scanning unit for reducing the area of a spot projected onto the target to achieve the effect of improving the resolution.

A further objective of the present invention is to provide a two-element fθ lens used for a MEMS laser scanning unit, and the two-element fθ lens can make a correction to correct a distortion of an optical axis caused by the off axis deviation of the scan light resulting in problems of an increased deviation of the main scanning direction and the sub scanning direction, and a change of a spot of a drum at the image into an oval-like shape, so that the two-element fθ lens can unify the size of each image spot to achieve the effect of enhancing the resolution quality.

Therefore, the two-element lens used for a micro-electro mechanical system (MEMS) laser scanning unit in accordance with the present invention is applicable for a MEMS reflecting mirror for reflecting a light source of emitting laser beams by a resonant sideway oscillation into the scan light to form an image on the target. As to a laser printer, the target is generally a drum. The spot of the image forms a scan light after the laser beam is emitted from the light source, scanned sideway by the MEMS reflecting mirror, and reflected by the MEMS reflecting mirror. After the angle and the position of the scan light are corrected by the two-element fθ lens of the invention, a spot may be formed on the drum. Since a photosensitive agent is coated onto the drum, data can be printed out on a piece of paper by sensing the carbon powder centralized on the paper.

The two-element fθ lens of the invention comprises a first lens and a second lens counted sequentially from a MEMS reflecting mirror, wherein the first lens includes a first optical surface and a second optical surface, and at least one of the first and second optical surfaces is an aspherical surface formed in the main scanning direction for correcting a non-constant speed scanning varied with time and within an interval on an image side of a MEMS reflecting mirror in a simple harmonic movement into a constant speed scanning, such that the projection of a laser beam onto an image side can give a constant speed scanning. The second lens includes a third optical surface and a fourth optical surface, and at least one of the third optical surface and the fourth optical is an aspherical optical surface formed in the main scanning direction for uniformizing the off axis deviation of the image formed on the drum and caused by a scan light deviated from the optical axis in the main scanning direction and the sub scanning direction, and correcting the scan light of the first lens to be focused at a target.

To make it easier for our examiner to understand the technical characteristics and effects of the present invention, we use preferred embodiments and related drawings for the detailed description of the present invention as follows.

DETAILED DESCRIPTION OF THE PREFERRED EMBODIMENTS

Figure 1:
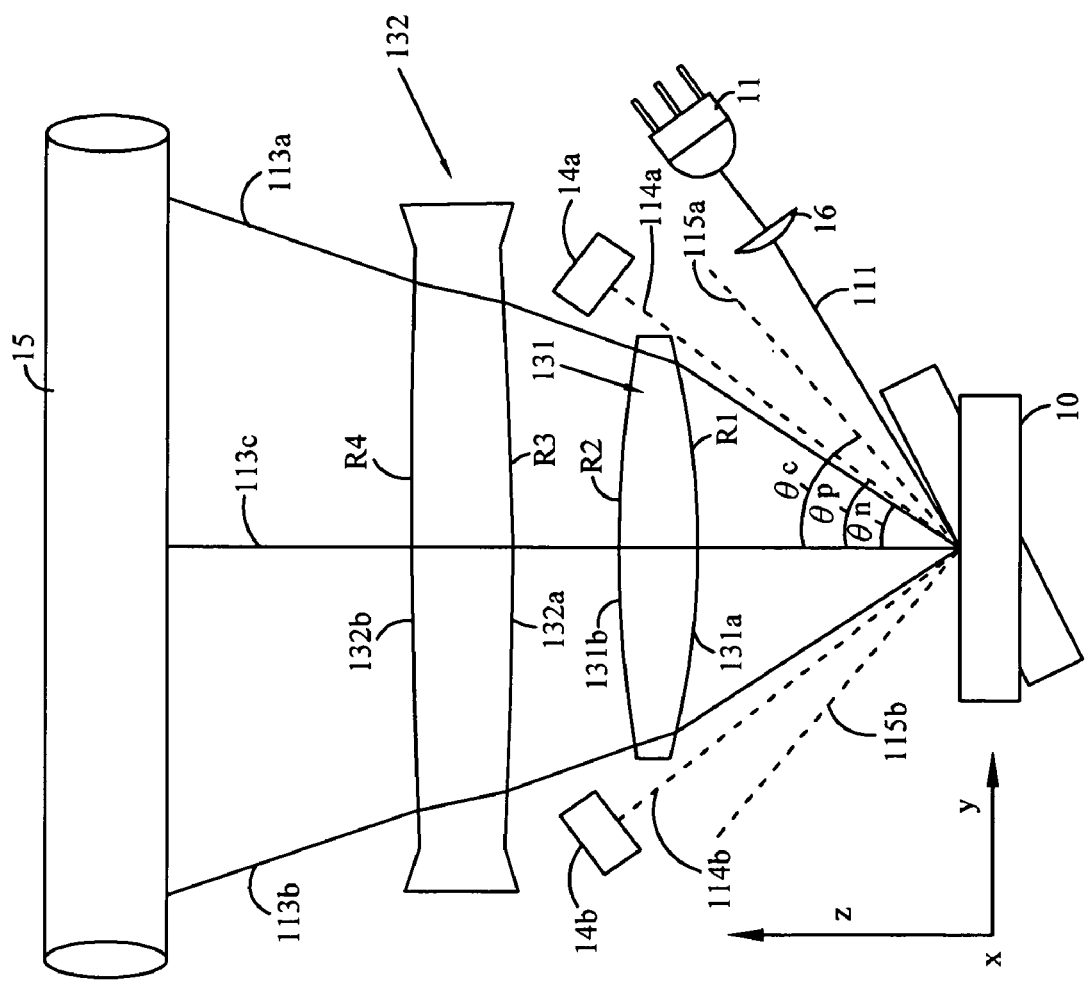
FIG. 1 shows a schematic view of optical paths of a two-element fθ lens in accordance with the present invention.

With reference to FIG. 1 for a schematic view of optical paths of a two-element fθ lens of a micro-electro mechanical system (MEMS) laser scanning unit in accordance with the present invention, the two-element fθ lens of the MEMS laser scanning unit of the present invention comprises a first lens 131 having a first optical surface 131a and a second optical surface 131b, a second lens 132 having a third optical surface 132a and a fourth optical surface 132b. In FIG. 1, the MEMS laser scanning unit comprises a laser source 11, a MEMS reflecting mirror 10, a cylindrical lens 16, two photoelectric sensors 14a, 14b, and a target for sensing light. In FIG. 1, the target is implemented by using a drum 15. After a beam 111 produced by the laser source 11 is passed through the cylindrical lens 16, the beam 111 is projected onto the MEMS reflecting mirror 10. The MEMS reflecting mirror 10 uses a resonant sideway oscillation method to reflect the beam 111 into scan lights 113a, 113b, 114a, 114b, 115a, 115b, wherein the scan lights 113a, 113b, 114a, 114b, 115a, 115b are projected in a X direction which is called a sub scanning direction, and projected in a Y direction which is called a main scanning direction, and the scanning angle of the MEMS reflecting mirror 10 is θc.

Figure 2:
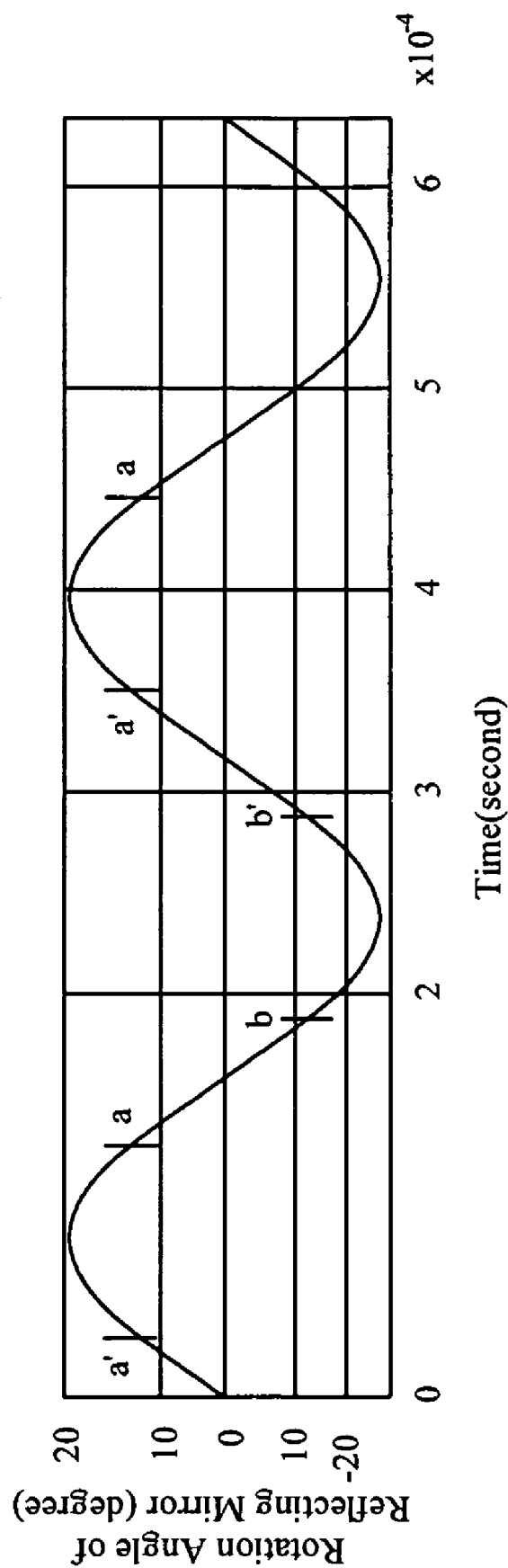
FIG. 2 shows a relation of a scanning angle θ versus time t of the MEMS reflecting mirror.

With reference to FIGS. 1 and 2, FIG. 2 shows a relation of a scanning angle θ versus time t of a MEMS reflecting mirror. Since the MEMS reflecting mirror 10 comes with a simple harmonic motion, and the angle of motion shows a sinusoidal change with time, therefore the angle and the time of reflecting the scan light are in a non-linear relation with each other. The oscillation angle of the MEM reflecting mirror 10 has a wave peak a-a' and a wave valley b-b' as shown in the figures, and its oscillation angle is significantly smaller than the wave sections a-b and a'-b', and this non-uniform angular speed may cause an image deviation produced on the drum 15 by the scan light easily. Therefore, photoelectric sensors 14a, 14b are installed within the range below the maximum scanning angle ±θc of the MEMS reflecting mirror 10, and the included angle is ±θp, and the laser beam starts to be reflected by the MEMS reflecting mirror 10 at the wave peak as shown in FIG. 2, which is equivalent to the scan light 115a as shown in FIG. 1.

If the photoelectric sensor 14a detects a scanned beam, it shows that the MEMS reflecting mirror 10 oscillates to an angle of +θp, which is equivalent to the scan light 114a as shown in FIG. 1. If the MEMS reflecting mirror 10 scans a point at an angle variation as shown in FIG. 2, such point is equivalent to the position of the scan light 113a. Now, the laser source 11 is controlled to start emitting the laser beam 111. When the MEMS reflecting mirror 10 scans to a point b as shown in FIG. 2, such point is equivalent to a position at where the scan light 113b ends (which is equivalent to the laser beam 111 emitted by the laser source 11a within an angle of ±θn). When the MEMS reflecting mirror 10 oscillates in an opposite direction, the laser source 11 is driven within a wave section a'-b' to start emitting the laser beam 111, so as to complete a cycle.

Figure 3:
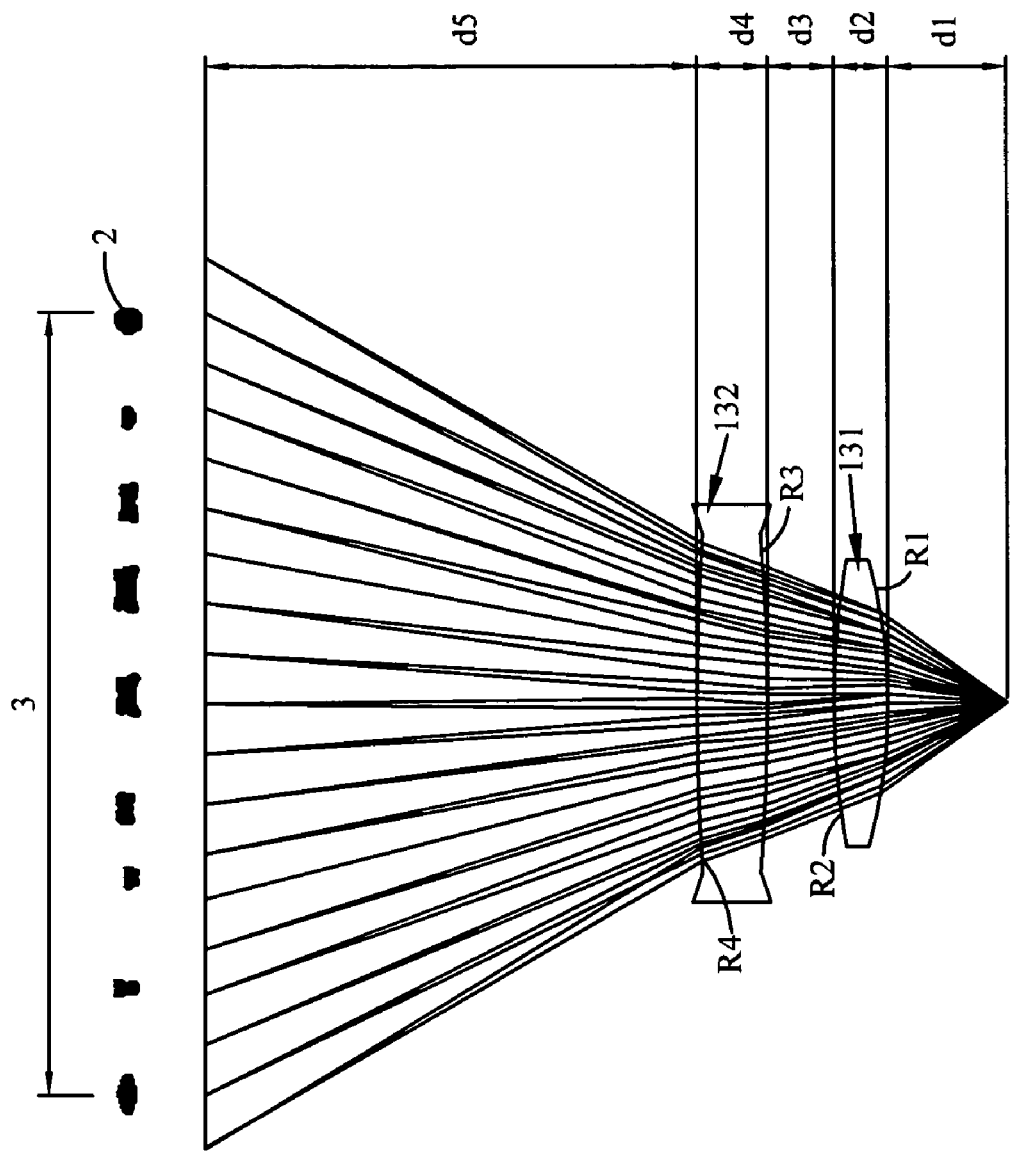
FIG. 3 shows an optical path chart and numerals of a scan light passing through a first lens and a second lens.

With reference to FIGS. 1 and 3, FIG. 3 shows an optical path chart of a scan light passing through a first lens and a second lens, wherein an angle of ±an is a valid scanning angle. If the MEMS reflecting mirror 10 is rotated to the angle of ±an, the laser source 11 starts emitting a laser beam 111 which is reflected by the MEMS reflecting mirror 10 to form a scan light, and the scan light is passed through the first lens 131 and refracted by the first optical surface 131a and the second optical surface 131b of the first lens 131, and the scan light reflected by the MEMS reflecting mirror 10 with a non-linear relation of distance and time is converted into a scan light with a linear relation of distance and time.

After the scan light is passed through the first lens 131 and the second lens 132, the optical properties of the first optical surface 131a, the second optical surface 131b, the third optical surface 132a and the fourth optical surface 132b of the first lens 131 and the second lens 132 focus the scan lights at the drum 15 and form a column of spots 2 on the drum 15, and the distance between the farthest two spots 2 projected on the drum 15 is called a valid scan window 3, wherein $d_1$ is the distance from the MEMS reflecting mirror 10 to the first optical surface 131a, $d_2$ is the distance from the first optical surface 131a to the second optical surface 131b, $d_3$ is the distance from the second optical surface 131b to the third optical surface 132a, $d_4$ is the distance from the third optical surface 132a to the fourth optical surface 132b, $d_5$ is the distance from the fourth optical surface 132b to the drum 15, $R_1$ is the radius of curvature of the first optical surface 131a, $R_2$ is the radius of curvature of the second optical surface 131b, $R_3$ is the radius of curvature of the third optical surface 132a, and $R_4$ is the radius of curvature of the fourth optical surface 132b.

Figure 4:
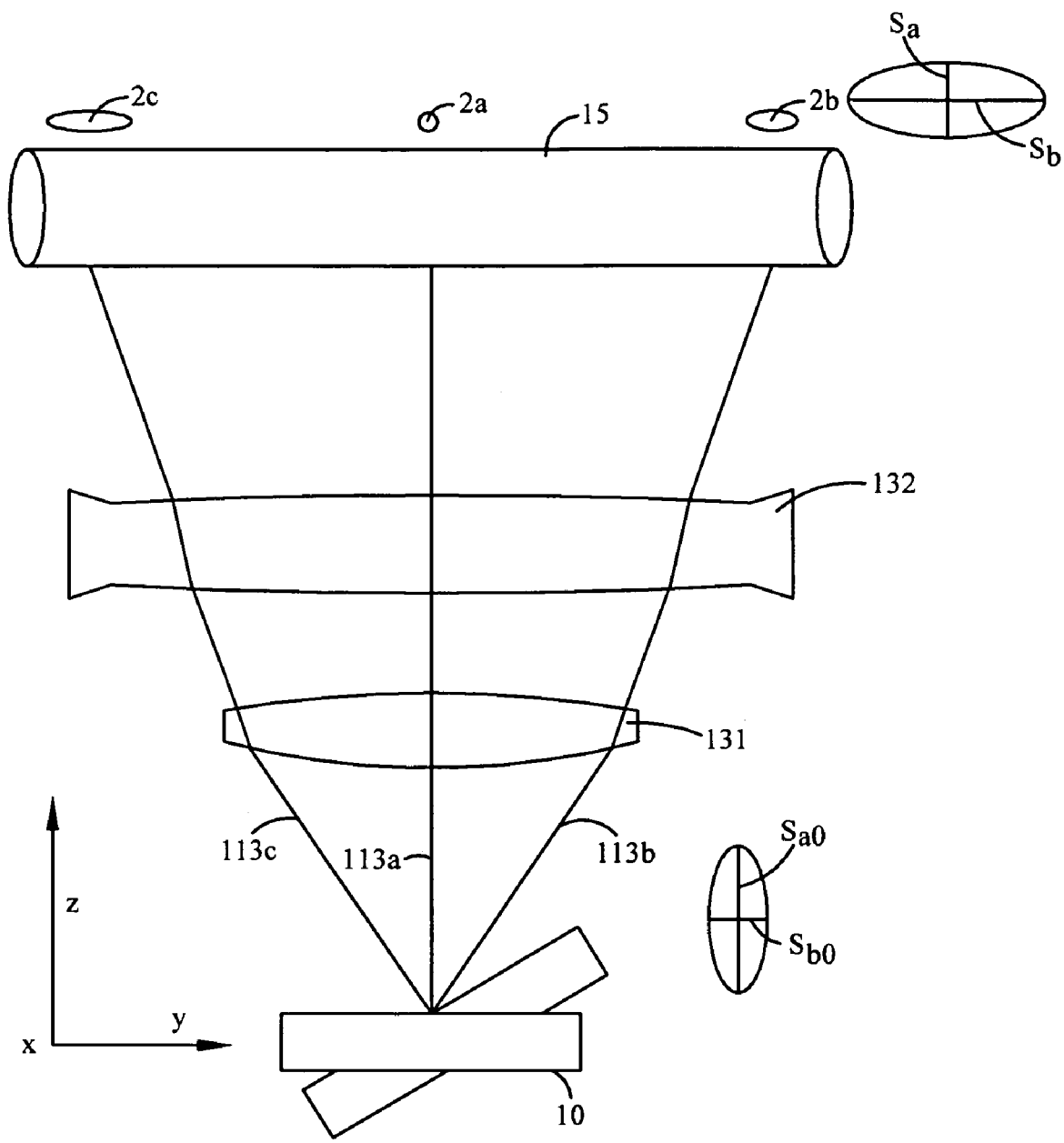
FIG. 4 shows a spot area varied with a different projecting position after a scan light is projected onto a drum.
Figure 5:
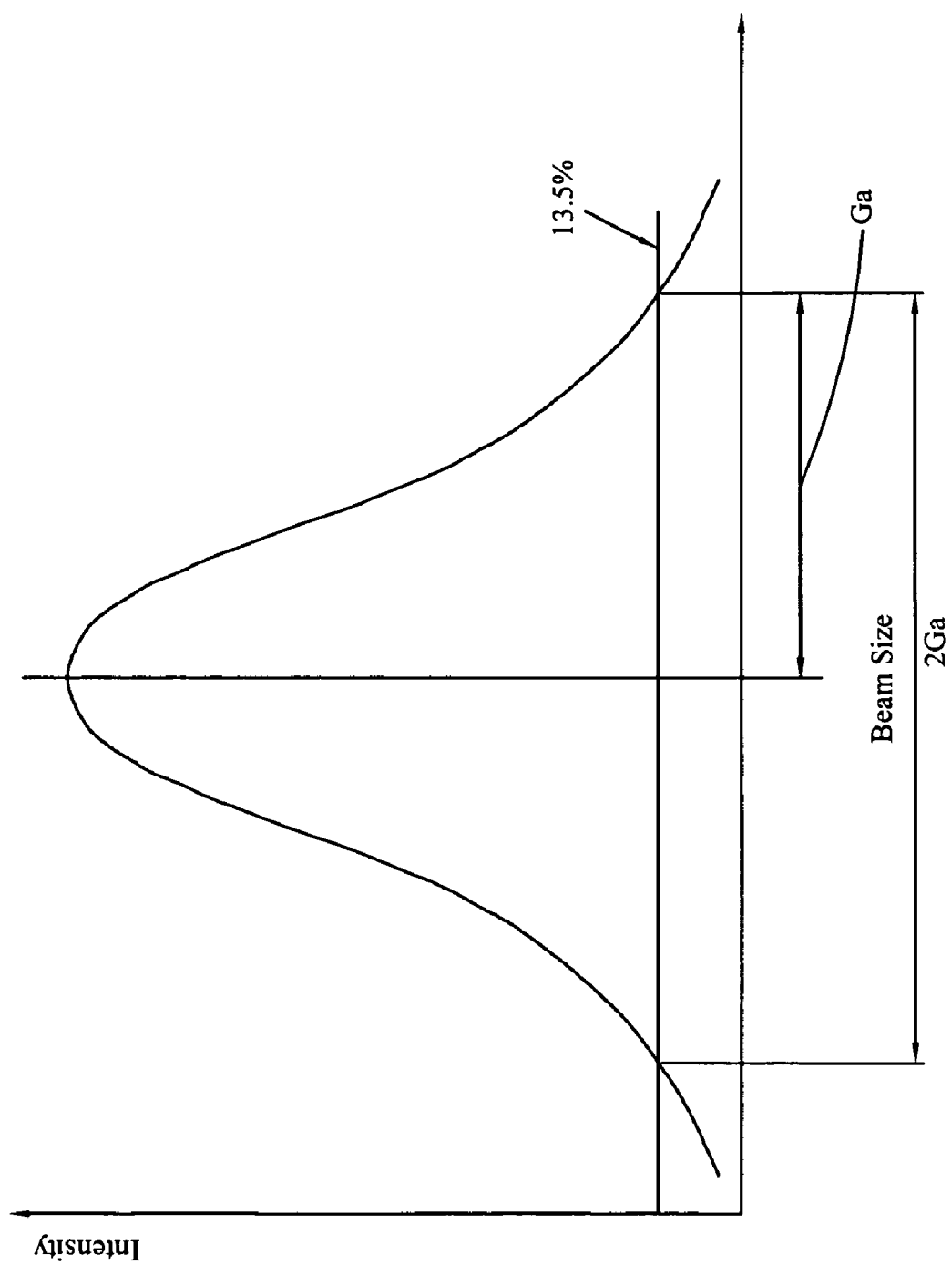
FIG. 5 shows a relation between a Gaussian distribution and a light intensity of a light beam.
Figure 6:
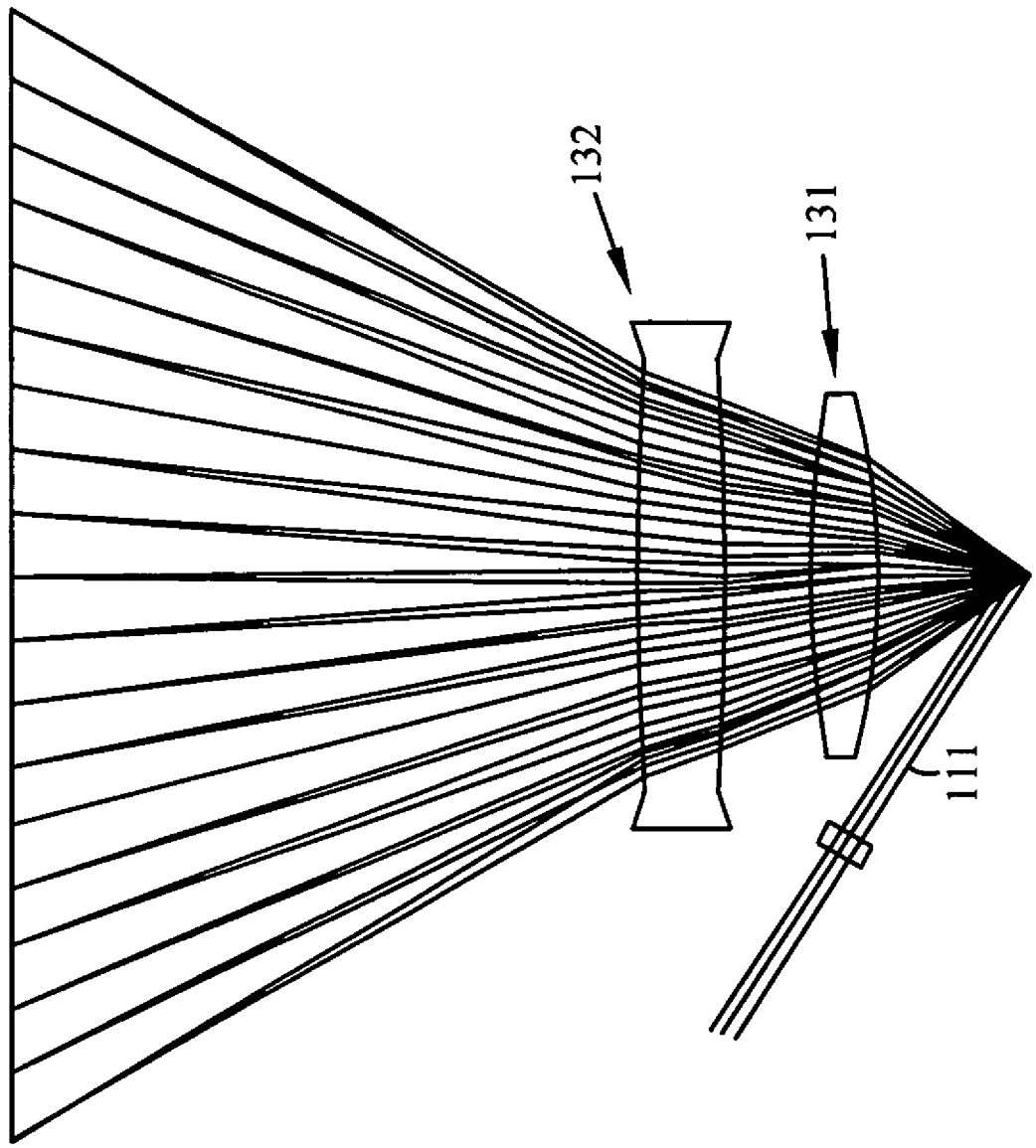
FIG. 6 shows an optical path chart of a scan line passing through a first lens and a second lens in accordance with a preferred embodiment of the present invention.

With reference to FIG. 4 for a schematic view of a spot area varied with a different projection angle after a scan light is projected onto a drum, if the scan light 113a is passed through the first lens 131 and the second lens 132 along the optical axis and projected onto the drum 15, the incident angle of the first lens 131 and the second lens 132 will be zero, and the deviation produced by the main scanning direction will equal to zero, such that the image on the drum 15 has a spot 2a in a quasi-circular shape. If the scan lights 113b, 113c passing through the first lens 131 and the second lens 132 respectively are projected onto the drum 15, the included angles between the optical axis and the first lens 131 and the second lens 132 respectively are non-zero, the deviation produced by the main scanning direction is non-zero, and thus the projection length of the main scanning direction is larger than the spot formed by the scan light 111a. This situation also applies to the sub scanning direction, and the spot formed by a scan light deviated from the scan light 111a is larger, and thus the spots 2b, 2c of the image formed on the drum 15 are in a quasi-elliptical shape, and the area of the spots 2b, 2c are larger than the spot 2a. $S_{a0}$ and $S_{b0}$ are the lengths of the spots of the scan lights reflected in the main scanning direction (Y-axis direction) and the sub scanning direction (X-axis direction) by the MEMS reflecting mirror 10, and $G_a$ and $G_b$ are the beam radii in the Y-axis direction and X-axis direction and the positions wherein the light intensity of the Gaussian beam of the scan lights equals to 13.5% as shown in FIG. 5, but FIG. 5 illustrates the beam radius in the Y-axis direction only.

In summation of the description above, the two-element fθ lens of the present invention corrects a distortion of the scan light of the Gaussian beam for the scan light reflected from the MEMS reflecting mirror 10, and converts a time-angular velocity relation into a time-distance relation. In the main scanning direction and the sub scanning direction, spots are formed on the image side to meet the resolution requirement, after the beam radii of the scan lights in the X-axis direction and the Y-axis direction passing through the fθ lenses at each angle have a certain percentage increase.

To achieve the foregoing effect, the two-element fθ lens of the invention comes with a first lens 131 having a first optical surface 131a and a second optical surface 131b and a second lens 132 having a third optical surface 132a and a fourth optical surface 132b of a design with a spherical surface or an aspherical surface along the main scanning direction or the sub scanning direction. If the aspherical surface is adopted, the aspherical surface is designed with the following equations:

1: Anamorphic Equation $$Z = \frac{(C_x)X^2 + (C_y)Y^2}{1 + \sqrt{1 - (1+K_x)(C_x)^2 X^2 - (1+K_y)(C_y)^2 Y^2}} + \qquad (2)$$

$$A_R[(1-A_P)X^2 + (1+A_P)Y^2]^2 + B_R[(1-B_P)X^2 + (1+B_P)Y^2]^3 +$$

$$C_R[(1-C_P)X^2 + (1+C_P)Y^2]^4 + D_R[(1-D_P)X^2 + (1+D_P)Y^2]^5$$

where, Z is the sag of any point on the surface parallel to the Z-axis, $C_x$ and $C_y$ are curvatures in the X direction and the Y direction respectively, $K_x$ and $K_y$ are the conic coefficients in the X direction and the Y direction respectively and correspond to eccentric city in the same way as conic coefficient for the Aspherical surface type, $A_R$, $B_R$, $C_R$ and $D_R$ are deformations from the conic coefficient of rotationally symmetric portions of the fourth order, the sixth order, the eighth and the tenth order respectively, and $A_P$, $B_P$, $C_P$ and $D_P$ are deformation from the conic coefficient of non-rotationally symmetric components to the fourth order, the sixth order, the eight order and the tenth order respectively. This reduces to Aspherical surface type when $C_x=C_y$, $K_x=K_y$, and $A_P=B_P=C_P=D_P=0$.

2: Toric Equation $$Z = Zy + \frac{(Cxy)X^2}{1 + \sqrt{1-(Cxy)^2 X^2}} \qquad (3)$$

$$Cxy = \frac{1}{(1/Cx) - Zy}$$

$$Zy = \frac{(C_y)Y^2}{1 + \sqrt{1-(1+K_y)(C_y)^2 Y^2}} + B_4 Y^4 + B_6 Y^6 + B_8 Y^8 + B_{10} Y^{10}$$

where, Z is the sag of any point on the surface parallel to the Z-axis; $C_y$ and $C_x$ are curvatures in the X direction and the Y direction respectively, $K_y$ is a conic coefficient in the Y direction, $B_4$, $B_6$, $B_8$ and $B_{10}$ are deformations from the conic coefficient to the fourth, sixth, eight and tenth order respectively. When $C_x=C_y$ and $K_y=A_P=B_P=C_P=D_P=0$ is reduced to a single spherical surface.

To maintain a uniform scan speed of the scan light projected onto the image side of the target, the invention maintains an equal distance between two spots in two equal time intervals and, the two-element fθ lens of the invention can correct the incident angle of the scan light from the scan light 113a to the scan light 113b by the first lens 131 and the second lens 132, so that after the reflection angle is corrected, the distance between two spots formed on the drum 15 by the two scan lights in two equal time intervals is equal. Further, after the laser beam 111 is reflected by the MEMS reflecting mirror 10, the radii of the Gaussian beam $G_a$, $G_b$ become bigger. After the scan light is passed through the distance from the MEMS reflecting mirror 10 to the drum 15, the radii of the Gaussian beam $G_a$, $G_b$ become even bigger. Such arrangement is in compliance with the actual resolution requirement. The two-element fθ lens of the invention further forms smaller Gaussian beams $G_a$ and $G_b$ between the scan light 113a and the scan light 113b reflected from the MEMS reflecting mirror 10 to focus the light beam at an image on the drum 15 to produce a smaller spot. The two-element fθ lens of the invention further uniformizes the spot size of the image on the drum 15 (wherein the spot size is limited within a range in compliance with the resolution requirement) to obtain the best resolution.

The two-element fθ lens of the invention comprises a first lens 131 and a second lens 132 counted from the MEMS reflecting mirror 10, wherein the first lens 131 is a bi-convex lens and the second lens 132 is a bi-convex lens, and the first lens 131 has a first optical surface 131a and a second optical surface 131b for converting the spot of a scan light reflected by the MEMS reflecting mirror 10 with a non-linear relation between angle and time into a linear relation between distance and time, and the second lens 132 has a third optical surface 132a and a fourth optical surface 132b for correcting the focus of the scan light of the first lens 131 onto the target, such that the two-element fθ lens projects a scan light reflected by the MEMS reflecting mirror 10 onto of the drum 15 to form an image. At least one of the first optical surface 131a, the second optical surface 131b, the third optical surface 132a and the fourth optical surface 132b is an aspherical optical surface in the main scanning direction, and at least one of the first optical surface 131a, the second optical surface 131b, the third optical surface 132a and the fourth optical surface 132b is an aspherical optical surface in the sub scanning direction or all optical surfaces in the sub scanning direction are spherical optical surfaces. Further, the assembly of the first lens 131 and the second lens 132 of the two-element fθ lens in accordance with the present invention has an optical effect in the main scanning direction that satisfies the conditions of Equations (4) and (5):

$$0.5 < \frac{d_3 + d_4 + d_5}{f_{(1)Y}} < 0.9 \qquad (4)$$

$$0.2 < \frac{d_5}{f_{(2)Y}} < 0.6 \qquad (5)$$

or satisfies the condition of Equation (6) in the main scanning direction:

$$0.5 < \left| f_{sY} \cdot \left( \frac{(n_{d1}-1)}{f_{(1)y}} + \frac{(n_{d2}-1)}{f_{(2)y}} \right) \right| < 0.8 \qquad (6)$$

and satisfies Equation (7) in the sub scanning direction:

$$0.086 < \left| \left( \frac{1}{R_{1x}} - \frac{1}{R_{2x}} \right) + \left( \frac{1}{R_{3x}} - \frac{1}{R_{4x}} \right) f_{sX} \right| < 1.0 \qquad (7)$$

where, $f_{(1)Y}$ is the focal length of the first lens 131 in the main scanning direction, $f_{(2)Y}$ is the focal length of the second lens 132 in the main scanning direction, d3 is the distance between an optical surface on a target side of the first lens 131 when θ=0° and an optical surface on the MEMS reflecting mirror side of the second lens 132, $d_4$ is the thickness of the second lens when θ=0°, $d_5$ is the distance between an optical surface on a target side of the second lens 132 when θ=0° and the target, $f_{sX}$ is the combination focal length of the two-element fθ lens in the sub scanning direction, $f_{sY}$ is the combination focal length of the two-element fθ lens in the main scanning direction, Rix is the radius of curvature of the $i^{th}$ optical surface in the sub scanning direction; $R_{iy}$ is the radius of curvature of the $i^{th}$ optical surface in the main scanning direction; and nd1 and $n_{d2}$ are the refraction indexes of the first lens 131 and the second lens 132 respectively.

Further, the spot uniformity produced by the two-element fθ lens of the invention can be indicated by the ratio δ of the largest spot size and the smallest spot size that satisfies the condition of Equation (8):

$$0.4 < \delta = \frac{\min(S_b \cdot S_a)}{\max(S_b \cdot S_a)} \quad (8)$$

The resolution produced by the two-element fθ lens of the invention is indicated by the ratio ηmax of the largest spot on the drum 15 formed by the scan light on the reflecting surface of the MEMS reflecting mirror 10 (or the ratio of scanning light of largest spot) and the ratio ηmin of the smallest spot formed by the scan light on the reflecting surface of the MEMS reflecting mirror 10 (or the ratio of scanning light of smallest spot), and the ratios satisfy the conditions of Equations (9) and (10):

$$\eta_{max} = \frac{\max(S_b \cdot S_a)}{(S_{b0} \cdot S_{a0})} < 0.10 \quad (9)$$

$$\eta_{min} = \frac{\min(S_b \cdot S_a)}{(S_{b0} \cdot S_{a0})} < 0.10 \quad (10)$$

wherein, $S_a$ and $S_b$ are the lengths of any one spot of the scan light formed on the drum in the Y direction and the X direction, δ is the ratio of the smallest spot and the largest spot on the drum 15, η is the ratio of the spot of the scan light on the reflecting surface of the MEMS reflecting mirror 10 and the spot on the drum 15; $S_{a0}$ and $S_{b0}$ are the lengths of the spots of the scan light on the reflecting surface of the MEMS reflecting mirror 10 in the main scanning direction and the sub scanning direction respectively.

To make it easier for our examiner to understand the technical characteristics of the present invention, we use the preferred embodiments accompanied with related drawings for the detailed description of the invention as follows.

The present invention discloses the following embodiments of a two-element fθ lens used for a micro-electro mechanical system (MEMS) laser scanning unit, and uses major components of the two-element fθ lens for the illustration of the invention, and thus the preferred embodiments can be applied in a MEMS laser scanning unit including but not limited to the two-element fθ lens with components illustrated in the embodiments only, but any other equivalents are intended to be covered in the scope of the present invention. In other words, any variation and modification of the two-element fθ lens used for a micro-electro mechanical system (MEMS) laser scanning unit can be made by the persons skilled in the art. In other words, each component of the MEMS laser scanning unit of the two-element fθ lens can be changed, modified or substituted. In other words, any variation and modification of the two-element fθ lens used for a micro-electro mechanical system (MEMS) laser scanning unit can be made by the persons skilled in the art. In other words, each component of the MEMS laser scanning unit of the two-element fθ lens can be changed, modified or substituted. For example, the radius of curvature, the shape, the selected material and the distance of the first and second lenses can be adjusted without any particular limitation.

First Preferred Embodiment

In this embodiment, a two-element fθ lens includes a first lens 131 and a second lens 132, wherein the first lens 131a is a bi-convex lens and the second lens 132 is a bi-convex lens, and the first lens 131 has a first optical surface 131a which is an spherical surface in a sub scanning direction and an aspherical surface in a main scanning direction designed according to Equation (3). A second optical surface 131b of the first lens 131, and the second lens 132 has a third optical surface 132a and a fourth optical surface 132b which are aspherical surfaces designed according to Equation (2). Related optical characteristics and aspherical surface parameters are listed in Tables 1 and 2.

TABLE 1

Optical Characteristics of fθ lens for First Preferred Embodiment

| optical surface | Radius (mm) | d, thickness (mm) | nd, refraction index |
|---|---|---|---|
| MEMS Reflection R0 | ∞ | 15.00 | 1 |
| lens 1 | | | 1.527 |
| R1 (Y Toric) | | | |
| R1x | 154.13 | 9.64 | |
| R1y* | 127.87 | | |
| R2 (Anamorphic) | | | |
| R2x* | −18.59 | 15.00 | |
| R2y* | −359.71 | | |
| lens 2 | | | 1.6071 |
| R3 (Anamorphic) | | | |
| R3x* | 97.76 | 12.00 | |
| R3y* | 400.00 | | |
| R4 (Anamorphic) | | | |
| R4x* | −61.37 | 107.77 | |
| R4y* | −553.23 | | |
| drum R5 | ∞ | 0.00 | |

*aspherical surface

TABLE 2

Aspherical Surface Parameters of Optical Surface for First Preferred Embodiment

Toric equation Coefficient

| optical surface | Ky, Conic Coefficient | 4th Order Coefficient (B4) | 6th Order Coefficient (B6) | 8th Order Coefficient (B8) | 10th Order Coefficient (B10) |
|---|---|---|---|---|---|
| R1* | 2.7213E+00 | 2.7938E−08 | 1.3377E−10 | 0.0000E+00 | 0.0000E+00 |

Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R2* | −7.5114E+00 | −1.3947E−06 | 8.3524E−10 | 0.0000E+00 | 0.0000E+00 |
| R3* | −1.0000E+01 | −9.2028E−07 | −1.8204E−11 | 0.0000E+00 | 0.0000E+00 |
| R4* | −1.1436E+02 | 5.3187E−07 | −1.9865E−11 | 0.0000E+00 | 0.0000E+00 |

| | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R2* | −1.8923E+00 | 3.7440E−01 | 0.0000E+00 | 0.0000E+00 | 0.0000E+00 |
| R3* | −1.0000E+01 | −1.2404E−01 | 0.0000E+00 | 0.0000E+00 | 0.0000E+00 |
| R4* | −1.3435E+02 | 5.5037E−01 | 0.0000E+00 | 0.0000E+00 | 0.0000E+00 |

Figure 7:
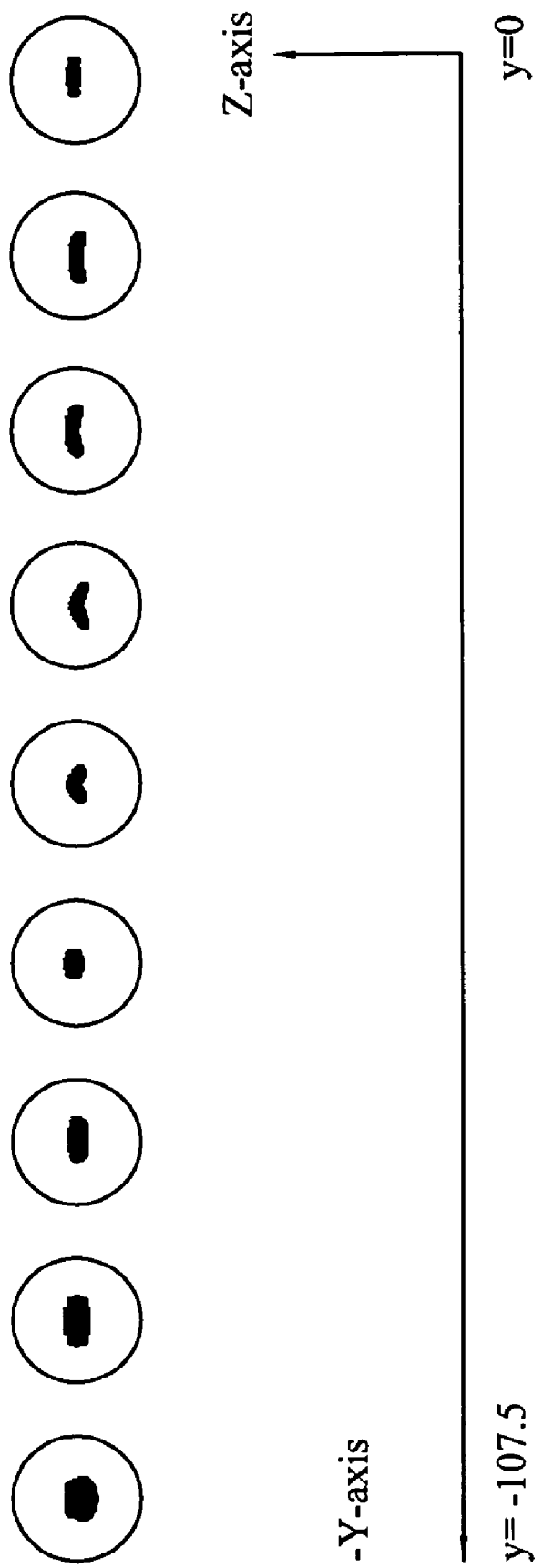
FIG. 7 shows spots in accordance with a first preferred embodiment of the present invention.

In the aforementioned optical surface of the two-element fθ lens, $f_{(1)Y}=180.147$, $f_{(2)Y}=390.634$, $f_{sX}=270.210$, and $f_{(1)Y}=128.433$ (mm) can convert the scan light into a spot formed by a scan light with a linear relation of distance and time, such that the spot with $S_{a0}=12.90$ (μm) and $S_{b0}=4618.85$ (μm) on the MEMS reflecting mirror 10 is scanned to produce a scan light and focus the scan light on the drum 15 to form a smaller spot 6, and satisfy the conditions of Equations (4) to (10) as shown in Table 3. The diameter (μm) of the Gaussian beam of the spots disposed on the drum 15 and having a distance of Y mm from the Z-axis of the center axis in the Y-direction to the Y-axis of the center axis is shown in Table 4. The spot distribution of this preferred embodiment is shown in FIG. 7.

TABLE 3

List of Satisfied Conditions for First Preferred Embodiment

| | |
|---|---|
| $\dfrac{d_3 + d_4 + d_5}{f_{(1)Y}}$ | 0.7481 |
| $\dfrac{d_5}{f_{(2)Y}}$ | 0.2759 |

TABLE 3-continued

List of Satisfied Conditions for First Preferred Embodiment

| | | |
|---|---|---|
| Main scanning direction | $\left\| f_{sY} \cdot \left( \dfrac{(n_{d1}-1)}{f_{(1)y}} + \dfrac{(n_{d2}-1)}{f_{(2)y}} \right) \right\|$ | 0.5746 |
| Sub scanning direction | $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.7820 |
| $\delta = \dfrac{\min(S_b \cdot S_a)}{\max(S_b \cdot S_a)}$ | | 0.4653 |
| $\eta_{max} = \dfrac{\max(S_b \cdot S_a)}{(S_{b0} \cdot S_{a0})}$ | | 0.0593 |
| $\eta_{min} = \dfrac{\min(S_b \cdot S_a)}{(S_{b0} \cdot S_{a0})}$ | | 0.0276 |

TABLE 4

Maximum Diameter of Spots of Gaussian Beam on a Drum for First Preferred Embodiment

| Y | −107.461 | −95.991 | −84.193 | −95.991 | −60.262 | −48.240 | −36.198 | −24.141 | 0.000 |
|---|---|---|---|---|---|---|---|---|---|
| Max diameter | 9.86E−03 | 8.52E−03 | 6.48E−03 | 6.05E−03 | 1.04E−02 | 1.75E−02 | 2.20E−02 | 2.36E−02 | 2.23E−02 |

Second Preferred Embodiment

In a two-element fθ lens having a first lens 131 and a second lens 132 in accordance with a second preferred embodiment of the present invention, the first lens 131 is a bi-convex lens and the second lens 132 is a bi-convex lens, and a first optical surface 131a and a second optical surface 131b of the first lens 131, a third optical surface 132a and a fourth optical surface 132b of the second lens 132 are aspherical surfaces designed according to Equation (2). Related optical characteristics and aspherical surface parameters are listed in Tables 5 and 6.

TABLE 5

Optical Characteristics of fθ lens for Second Preferred Embodiment

| optical surface | Radius (mm) | d, thickness (mm) | nd, refraction index |
|---|---|---|---|
| MEMS Reflection R0 | ∞ | 23.33 | 1 |
| lens 1 | | | 1.527 |
| R1 (Anamorphic) | | | |
| R1x* | 72.15 | 9.88 | |
| R1y* | 124.78 | | |
| R2 (Anamorphic) | | | |
| R2x* | −15.41 | 15.00 | |
| R2y* | −599.12 | | |
| lens 2 | | | 1.527 |
| R3 (Anamorphic) | | | |
| R3x* | 43.60 | 12.00 | |
| R3y* | 244.04 | | |
| R4 (Anamorphic) | | | |
| R4x* | 45.82 | 108.49 | |
| R4y* | −600.00 | | |
| drum R5 | ∞ | 0.00 | |

*aspherical surface

Figure 8:
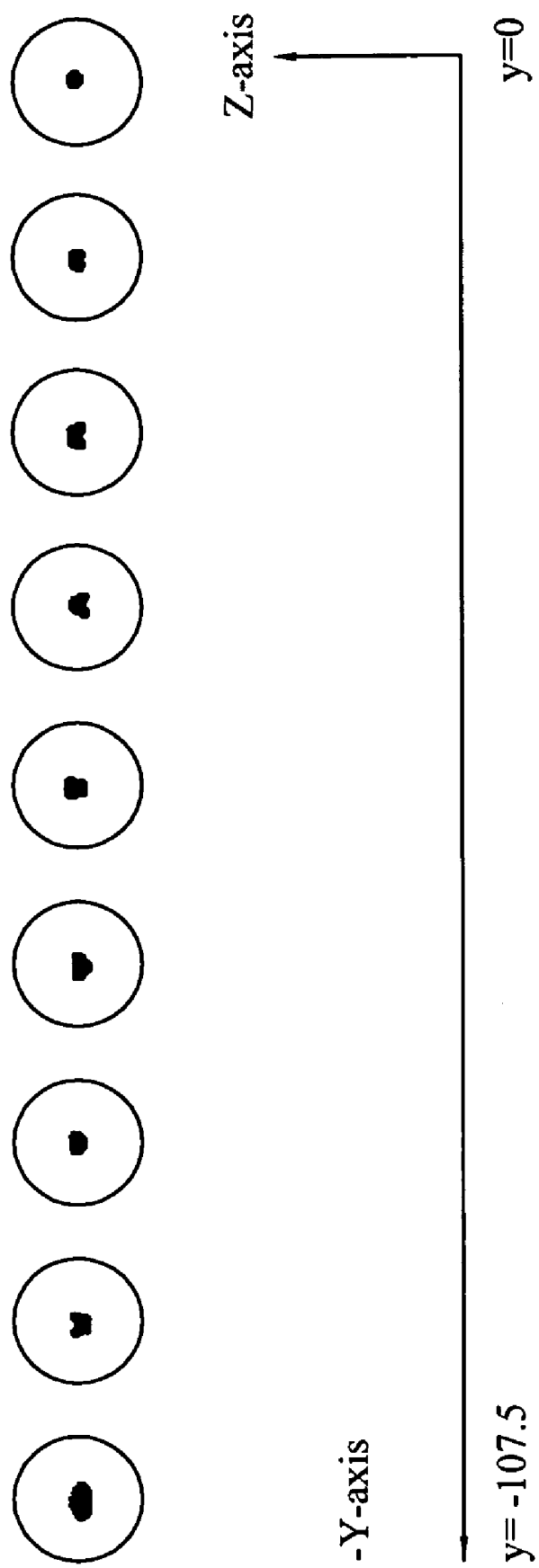
FIG. 8 shows spots in accordance with a second preferred embodiment of the present invention.

In the aforementioned optical surface of the two-element fθ lens, $f_{(1)Y}$=196.796, $f_{(2)Y}$=330.649, $f_{sX}$=22.674, $f_{(1)Y}$=128.908 (mm) can convert the scan light into a spot formed by a scan light with a linear relation of distance and time, such that the spot with $S_{a0}$=12.90 (μm) and $S_{b0}$=4618.85 (μm) on the MEMS reflecting mirror 10 is scanned to produce a scan light and focus the scan light on the drum 15 to form a smaller spot 8, and satisfy the conditions of Equations (4) to (10) as shown in Table 7. The diameter (μm) of the Gaussian beam of the spots disposed on the drum 15 and having a distance of Y mm from the Z-axis of the center axis in the Y-direction to the Y-axis of the center axis is shown in Table 8. The spot distribution of this preferred embodiment is shown in FIG. 8.

TABLE 7

List of Satisfied Conditions for Second Preferred Embodiment

| | |
|---|---|
| $\dfrac{d_3 + d_4 + d_5}{f_{(1)Y}}$ | 0.6885 |
| $\dfrac{d_5}{f_{(2)Y}}$ | 0.3281 |
| main scanning direction $\left\| f_{sY} \cdot \left( \dfrac{(n_{d1} - 1)}{f_{(1)y}} + \dfrac{(n_{d2} - 1)}{f_{(2)y}} \right) \right\|$ | 0.5507 |
| sub scanning direction | 0.1039 |
| $\delta = \dfrac{\min(S_b \cdot S_a)}{\max(S_b \cdot S_a)}$ | 0.4001 |
| $\eta_{max} = \dfrac{\max(S_b \cdot S_a)}{(S_{b0} \cdot S_{a0})}$ | 0.0844 |
| $\eta_{min} = \dfrac{\min(S_b \cdot S_a)}{(S_{b0} \cdot S_{a0})}$ | 0.0335 |

TABLE 6

Aspherical Surface Parameters of Optical Surface for Second Preferred Embodiment Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R1* | 2.0781E+00 | 1.2318E−05 | 1.3661E−10 | 0.0000E+00 | 0.0000E+00 |
| R2* | −1.9587E+01 | −1.4038E−06 | 8.6205E−10 | 0.0000E+00 | 0.0000E+00 |
| R3* | −1.0000E+01 | −9.7765E−07 | 1.6357E−11 | 0.0000E+00 | 0.0000E+00 |
| R4* | −1.3929E+02 | 5.4876E−07 | −3.3294E−11 | 0.0000E+00 | 0.0000E+00 |

| | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R1* | −4.3754E+00 | −9.8094E−01 | 0.0000E+00 | 0.0000E+00 | 0.0000E+00 |
| R2* | −4.7854E+00 | 3.6989E−01 | 0.0000E+00 | 0.0000E+00 | 0.0000E+00 |
| R3* | −1.0000E+01 | −8.7446E−02 | 0.0000E+00 | 0.0000E+00 | 0.0000E+00 |
| R4* | −1.4715E+02 | 5.7496E−01 | 0.0000E+00 | 0.0000E+00 | 0.0000E+00 |

TABLE 8

Maximum Diameter of Spots of Gaussian Beam on a Drum for Second Preferred Embodiment

| Y | −107.460 | −96.078 | −84.301 | −96.078 | −60.302 | −48.240 | −36.174 | −24.112 | 0.000 |
|---|---|---|---|---|---|---|---|---|---|
| Max diameter | 1.07E−02 | 6.17E−03 | 4.96E−03 | 6.86E−03 | 5.35E−03 | 5.98E−03 | 6.41E−03 | 4.47E−03 | 3.28E−03 |

Third Preferred Embodiment

In a two-element fθ lens having a first lens 131 and a second lens 132 in accordance with a second preferred embodiment of the present invention, the first lens 131 is a bi-convex lens and the second lens 132 is a bi-convex lens, and a first optical surface 131a and a second optical surface 131b of the first lens 131, a third optical surface 132a and a fourth optical surface 132b of the second lens 132 are aspherical surfaces designed according to Equation (2). Related optical characteristics and aspherical surface parameters are listed in Tables 9 and 10.

TABLE 9

Optical Characteristics of fθ lens for Third Preferred Embodiment

| optical surface | Radius (mm) | d, thickness (mm) | nd, refraction index |
|---|---|---|---|
| MEMS Reflection R0 | ∞ | 23.18 | 1 |
| lens 1 | | | 1.527 |
| R1 (Anamorphic) | | | |
| R1x* | 70.52 | 9.68 | |
| R1y* | 123.64 | | |
| R2 (Anamorphic) | | | |
| R2x* | −15.41 | 14.81 | |
| R2y* | −555.30 | | |
| lens 2 | | | 1.6071 |
| R3 (Anamorphic) | | | |
| R3x* | 44.07 | 11.91 | |
| R3y* | 315.00 | | |
| R4 (Anamorphic) | | | |
| R4x* | 45.97 | 108.90 | |
| R4y* | −566.79 | | |
| drum R5 | ∞ | 0.00 | |

*aspherical surface

TABLE 10

Aspherical Surface Parameters of Optical Surface for Third Preferred Embodiment

Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R1* | 2.2481E+00 | 1.2584E−05 | 1.2896E−10 | 0.0000E+00 | 0.0000E+00 |
| R2* | −7.5452E+00 | −1.4140E−06 | 8.5697E−10 | 0.0000E+00 | 0.0000E+00 |
| R3* | −8.3508E+00 | −9.0972E−07 | 1.6827E−12 | 0.0000E+00 | 0.0000E+00 |
| R4* | −1.3907E+02 | 5.3447E−07 | −2.1351E−11 | 0.0000E+00 | 0.0000E+00 |

| | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R1* | −5.2480E+00 | −9.7402E−01 | 0.0000E+00 | 0.0000E+00 | 0.0000E+00 |
| R2* | −4.9462E+00 | 3.7443E−01 | 0.0000E+00 | 0.0000E+00 | 0.0000E+00 |
| R3* | −9.6695E+00 | −1.1990E−01 | 0.0000E+00 | 0.0000E+00 | 0.0000E+00 |
| R4* | −1.3892E+02 | 5.5567E−01 | 0.0000E+00 | 0.0000E+00 | 0.0000E+00 |

Figure 9:
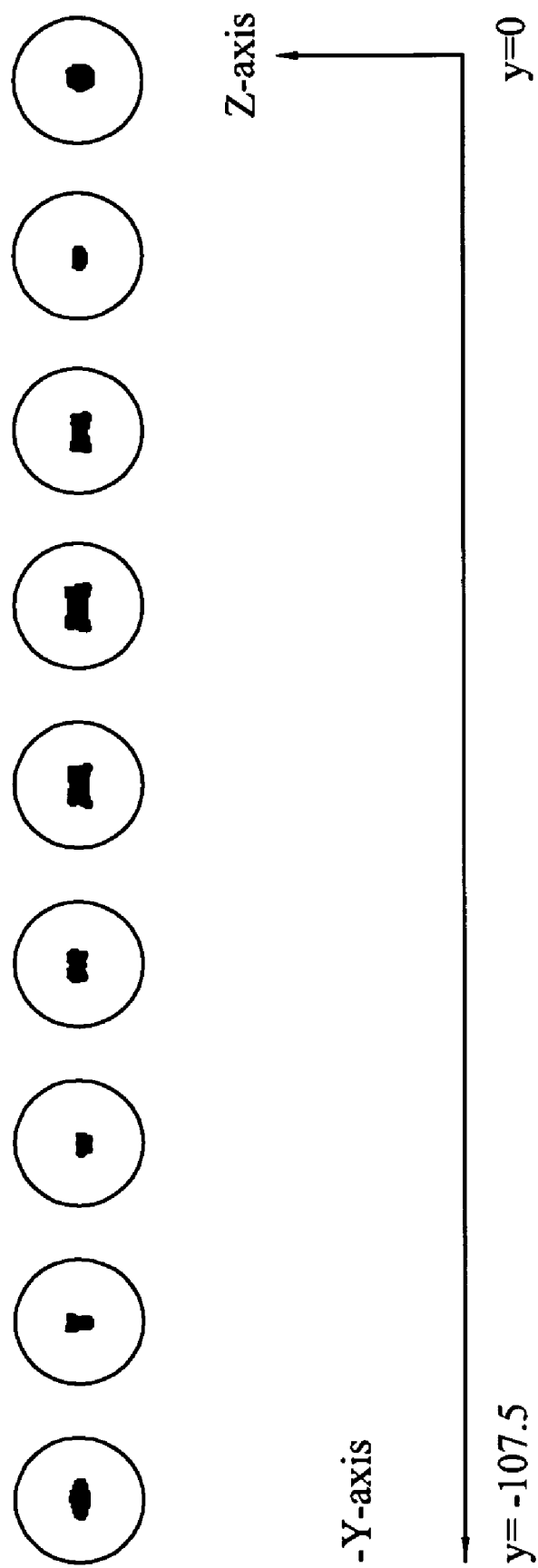
FIG. 9 shows spots in accordance with a third preferred embodiment of the present invention.

In the aforementioned optical surface of the two-element fθ lens, $f_{(1)Y}$=192.741, $f_{(2)Y}$=340.815, $f_{sX}$=22.414, $f_{sY}$=128.586 (mm) can convert the scan light into a spot formed by a scan light with a linear relation of distance and time, such that the spot with $S_{a0}$=12.90 (μm) and $S_{b0}$=4618.85 (μm) on the MEMS reflecting mirror 10 is scanned to produce a scan light and focus the scan light on the drum 15 to form a smaller spot 10, and satisfy the conditions of Equations (4) to (10) as shown in Table 11. The diameter (μm) of the Gaussian beam of the spots disposed on the drum 15 and having a distance of Y mm from the Z-axis of the center axis in the Y-direction to the Y-axis of the center axis is shown in Table 12. The spot distribution of this preferred embodiment is shown in FIG. 9.

TABLE 11

List of Satisfied Conditions for Third Preferred Embodiment

|  |  |  |
|---|---|---|
|  | $\left\| f_{sY} \cdot \left( \frac{(n_{d1}-1)}{f_{(1)y}} + \frac{(n_{d2}-1)}{f_{(2)y}} \right) \right\|$ | 0.7036 |
|  | $\dfrac{d_5}{f_{(2)Y}}$ | 0.3195 |
| main scanning direction | $\left\| f_{sY} \cdot \left( \frac{(n_{d1}-1)}{f_{(1)y}} + \frac{(n_{d2}-1)}{f_{(2)y}} \right) \right\|$ | 0.5806 |
| sub scanning direction | $\left\| \left( \frac{1}{R_{1x}} - \frac{1}{R_{2x}} \right) + \left( \frac{1}{R_{3x}} - \frac{1}{R_{4x}} \right) f_{sX} \right\|$ | 0.1000 |
|  | $\delta = \dfrac{\min(S_b \cdot S_a)}{\max(S_b \cdot S_a)}$ | 0.4103 |
|  | $\eta_{max} = \dfrac{\max(S_b \cdot S_a)}{(S_{b0} \cdot S_{a0})}$ | 0.0853 |
|  | $\eta_{max} = \dfrac{\max(S_b \cdot S_a)}{(S_{b0} \cdot S_{a0})}$ | 0.0350 |

Fourth Preferred Embodiment

In a two-element fθ lens having a first lens 131 and a second lens 132 in accordance with a second preferred embodiment of the present invention, the first lens 131 is a bi-convex lens and the second lens 132 is a bi-convex lens, and a first optical surface 131*a* and a second optical surface 131*b* of the first lens 131, a third optical surface 132*a* and a fourth optical surface 132*b* of the second lens 132 are aspherical surfaces designed according to Equation (2). Related optical characteristics and aspherical surface parameters are listed in Tables 13 and 14.

TABLE 13

Optical Characteristics of fθ lens for Fourth Preferred Embodiment

| optical surface | Radius (mm) | d, thickness (mm) | nd, refraction index |
|---|---|---|---|
| MEMS Reflection R0 | ∞ | 9.56 | 1 |
| lens 1 |  |  | 1.527 |
| R1 (Anamorphic) |  |  |  |
| R1x* | 172.85 | 9.56 |  |
| R1y* | 127.81 |  |  |
| R2 (Anamorphic) |  |  |  |
| R2x* | −18.52 | 15.00 |  |
| R2y* | −351.15 |  |  |
| lens 2 |  |  | 1.6071 |
| R3 (Anamorphic) |  |  |  |
| R3x* | 97.26 | 12.00 |  |
| R3y* | 400.00 |  |  |
| R4 (Anamorphic) |  |  |  |
| R4x* | −61.26 | 107.62 |  |
| R4y* | −573.04 |  |  |
| drum R5 | ∞ | 0.00 |  |

*aspherical surface

TABLE 12

Maximum Diameter of Spots of Gaussian Beam on a Drum for Third Preferred Embodiment

| Y | −107.460 | −95.927 | −84.090 | −95.927 | −60.139 | −48.128 | −36.107 | −24.077 | 0.000 |
|---|---|---|---|---|---|---|---|---|---|
| Max diameter | 1.66E−02 | 1.95E−02 | 1.64E−02 | 8.51E−03 | 1.20E−02 | 1.63E−02 | 1.96E−02 | 1.94E−02 | 1.59E−02 |

TABLE 14

Aspherical Surface Parameters of Optical Surface for Fourth Preferred Embodiment

| | | Anamorphic equation Coefficient | | | |
|---|---|---|---|---|---|
| optical surface | Ky, Conic Coefficient | 4th Order Coefficient (AR) | 6th Order Coefficient (BR) | 8th Order Coefficient (CR) | 10th Order Coefficient (DR) |
| R1* | 2.5793E+00 | 1.5596E−08 | 1.3158E−10 | 0.0000E+00 | 0.0000E+00 |
| R2* | −1.0000E+01 | −1.3913E−06 | 8.4170E−10 | 0.0000E+00 | 0.0000E+00 |
| R3* | −8.3403E+00 | −9.0970E−07 | −1.4453E−11 | 0.0000E+00 | 0.0000E+00 |
| R4* | −1.1534E+02 | 5.3440E−07 | −2.1346E−11 | 0.0000E+00 | 0.0000E+00 |
| | Kx, Conic Coefficient | 4th Order Coefficient (AP) | 6th Order Coefficient (BP) | 8th Order Coefficient (CP) | 10th Order Coefficient (DP) |
| R1* | 2.2413E+01 | 7.5552E−01 | 0.0000E+00 | 0.0000E+00 | 0.0000E+00 |
| R2* | −2.5095E+00 | 3.7416E−01 | 0.0000E+00 | 0.0000E+00 | 0.0000E+00 |
| R3* | −1.0000E+01 | −1.1991E−01 | 0.0000E+00 | 0.0000E+00 | 0.0000E+00 |
| R4* | −1.3383E+02 | 5.5557E−01 | 0.0000E+00 | 0.0000E+00 | 0.0000E+00 |

Figure 10:
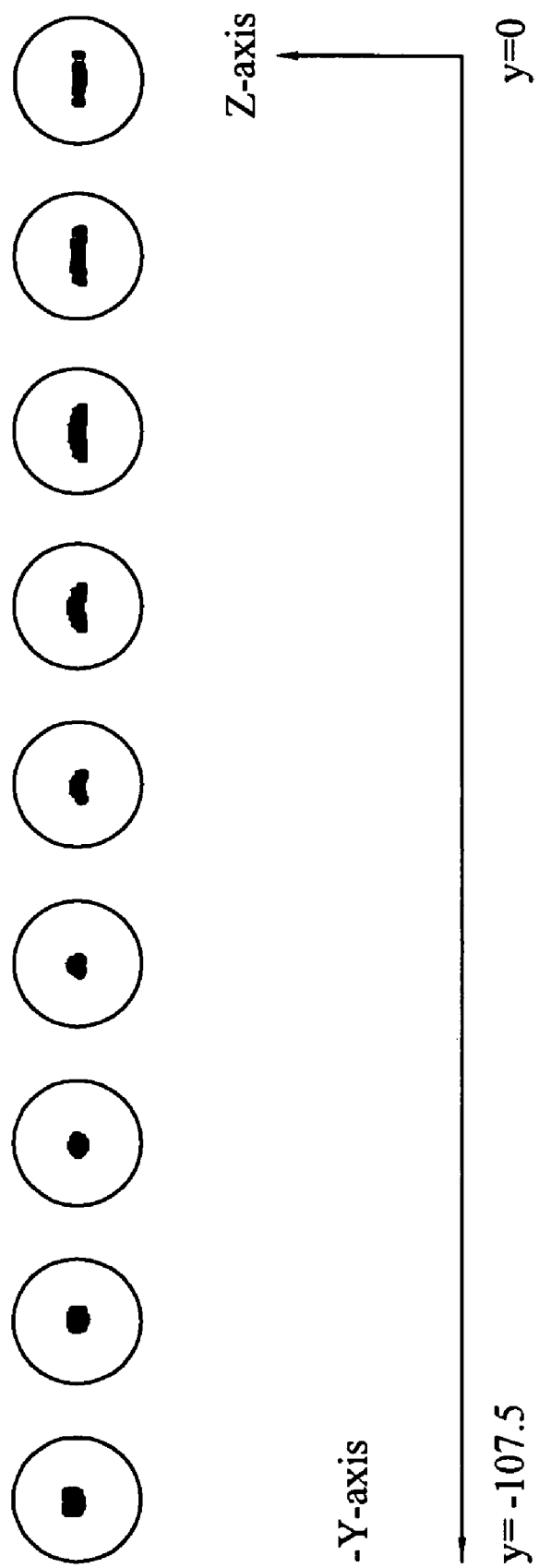
FIG. 10 shows spots in accordance with a fourth preferred embodiment of the present invention.

In the aforementioned optical surface of the two-element fθ lens, $f_{(1)Y}$=178.957, $f_{(2)Y}$=396.249, $f_{sX}$=27.264, $f_{sY}$=128.360 (mm) can convert the scan light into a spot formed by a scan light with a linear relation of distance and time, such that the spot with $S_{a0}$=12.90 (µm) and $S_{b0}$=4618.85 (µm) on the MEMS reflecting mirror 10 is scanned to produce a scan light and focus the scan light on the drum 15 to form a smaller spot 12, and satisfy the conditions of Equations (4) to (10) as shown in Table 15. The diameter (µm) of the Gaussian beam of the spots disposed on the drum 15 and having a distance of Y mm from the Z-axis of the center axis in the Y-direction to the Y-axis of the center axis is shown in Table 16. The spot distribution of this preferred embodiment is shown in FIG. 10.

TABLE 15

List of Satisfied Conditions for Fourth Preferred Embodiment

| | |
|---|---|
| $\dfrac{d_3 + d_4 + d_5}{f_{(1)Y}}$ | 0.7522 |
| $\dfrac{d_5}{f_{(2)Y}}$ | 0.2715 |

TABLE 15-continued

List of Satisfied Conditions for Fourth Preferred Embodiment

| | | |
|---|---|---|
| main scanning direction | $\left\| f_{sY} \cdot \left( \dfrac{(n_{d1} - 1)}{f_{(1)y}} + \dfrac{(n_{d2} - 1)}{f_{(2)y}} \right) \right\|$ | 0.5746 |
| sub scanning direction | $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.7852 |
| $\delta = \dfrac{\min(S_b \cdot S_a)}{\max(S_b \cdot S_a)}$ | | 0.4823 |
| $\eta_{max} = \dfrac{\max(S_b \cdot S_a)}{(S_{b0} \cdot S_{a0})}$ | | 0.0577 |
| $\eta_{min} = \dfrac{\min(S_b \cdot S_a)}{(S_{b0} \cdot S_{a0})}$ | | 0.0278 |

TABLE 16

Maximum Diameter of Spots of Gaussian Beam on a Drum for Fourth Preferred Embodiment

| Y | −107.463 | −95.538 | −83.553 | −95.538 | −59.670 | −47.760 | −35.843 | −23.909 | 0.000 |
|---|---|---|---|---|---|---|---|---|---|
| Max diameter | 5.82E−03 | 8.73E−03 | 6.85E−03 | 4.83E−03 | 5.39E−03 | 5.69E−03 | 5.91E−03 | 4.74E−03 | 2.21E−03 |

Fifth Preferred Embodiment

In a two-element fθ lens having a first lens 131 and a second lens 132 in accordance with a second preferred embodiment of the present invention, the first lens 131 is a bi-convex lens and the second lens 132 is a bi-convex lens, and a first optical surface 131a and a second optical surface 131b of the first lens 131, a third optical surface 132a and a fourth optical surface 132b of the second lens 132 are aspherical surfaces designed according to Equation (2). Related optical characteristics and aspherical surface parameters are listed in Tables 17 and 18.

Figure 11:
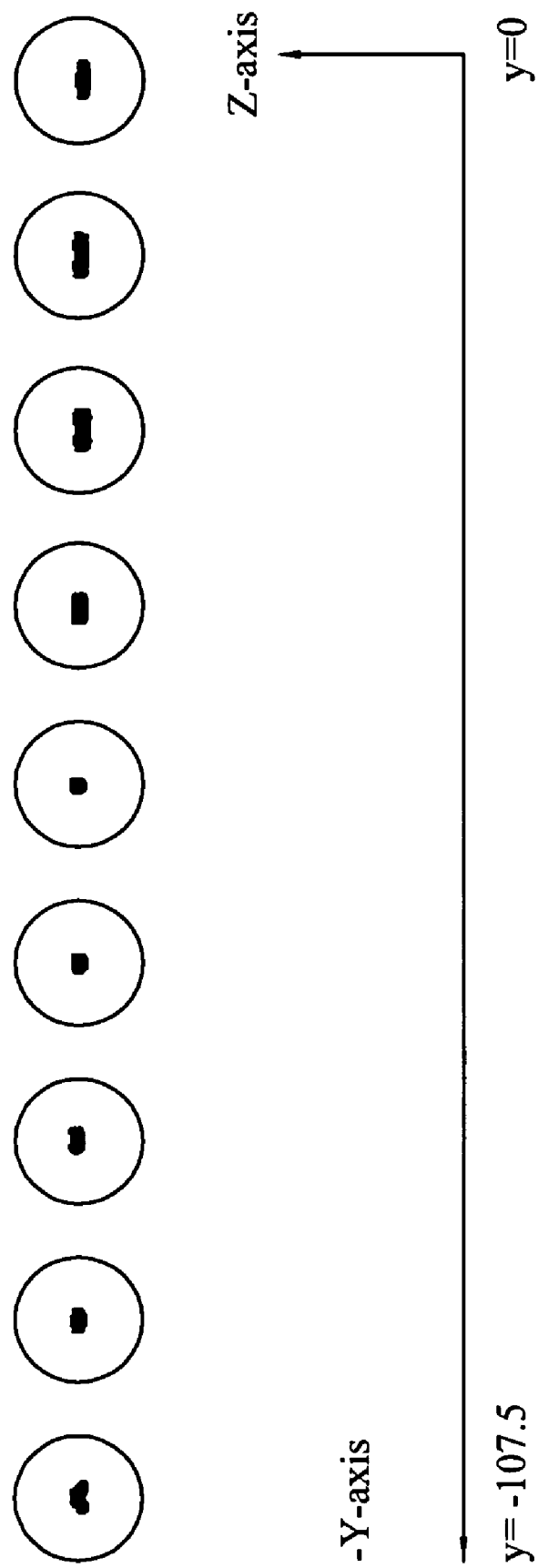
FIG. 11 shows spots in accordance with a fifth preferred embodiment of the present invention.

In the aforementioned optical surface of the two-element fθ lens, $f_{(1)Y}=179.081$, $f_{(2)Y}=390.946$, $f_{sX}=27.094$, $f_{(1)Y}=127.950$ (mm) can convert the scan light into a spot formed by a scan light with a linear relation of distance and time, such that the spot with $S_{a0}=12.90$ (μm) and $S_{b0}=4618.85$ (μm) on the MEMS reflecting mirror 10 is scanned to produce a scan light and focus the scan light on the drum 15 to form a smaller spot 12, and satisfy the conditions of Equations (4) to (10) as shown in Table 19. The diameter (μm) of the Gaussian beam of the spots disposed on the drum 15 and having a distance of Y mm from the Z-axis of the center axis in the Y-direction to the Y-axis of the center axis is shown in Table 20. The spot distribution of this preferred embodiment is shown in FIG. 11.

TABLE 17

Optical Characteristics of fθ lens for Fifth Preferred Embodiment

| optical surface | Radius (mm) | d, thickness (mm) | nd, refraction index |
|---|---|---|---|
| MEMS Reflection R0 | ∞ | 18.96 | 1 |
| lens 1 | | | 1.527 |
| R1 (Anamorphic) | | | |
| R1x* | −300.00 | 10.00 | |
| R1y* | 131.90 | | |
| R2 (Anamorphic) | | | |
| R2x* | −18.13 | 15.00 | |
| R2y* | −323.59 | | |
| lens 2 | | | 1.6071 |
| R3 (Anamorphic) | | | |
| R3x* | 54.02 | 12.00 | |
| R3y* | 400.00 | | |
| R4 (Anamorphic) | | | |
| R4x* | −76.28 | 107.23 | |
| R4y* | −554.29 | | |
| drum R5 | ∞ | 0.00 | |

*aspherical surface

TABLE 19

List of Satisfied Conditions for Fifth Preferred Embodiment

| | | |
|---|---|---|
| | $\dfrac{d_3 + d_4 + d_5}{f_{(1)Y}}$ | 0.7496 |
| | $\dfrac{d_5}{f_{(2)Y}}$ | 0.2742 |
| main scanning direction | $\left\| f_{sY} \cdot \left( \dfrac{(n_{d1} - 1)}{f_{(1)y}} + \dfrac{(n_{d2} - 1)}{f_{(2)y}} \right) \right\|$ | 0.5753 |
| sub scanning direction | $\left\| \left( \dfrac{1}{R_{1x}} - \dfrac{1}{R_{2x}} \right) + \left( \dfrac{1}{R_{3x}} - \dfrac{1}{R_{4x}} \right) f_{sX} \right\|$ | 0.9085 |
| | $\delta = \dfrac{\min(S_b \cdot S_a)}{\max(S_b \cdot S_a)}$ | 0.4742 |
| | $\eta_{max} = \dfrac{\max(S_b \cdot S_a)}{(S_{b0} \cdot S_{a0})}$ | 0.0558 |
| | $\eta_{min} = \dfrac{\min(S_b \cdot S_a)}{(S_{b0} \cdot S_{a0})}$ | 0.0265 |

TABLE 18

Aspherical Surface Parameters of Optical Surface for Fifth Preferred Embodiment

Anamorphic equation Coefficient

| optical surface | Ky, Conic Coefficient | 4th Order Coefficient (AR) | 6th Order Coefficient (BR) | 8th Order Coefficient (CR) | 10th Order Coefficient (DR) |
|---|---|---|---|---|---|
| R1* | 3.6790E+00 | 3.9127E−08 | 1.3246E−10 | 0.0000E+00 | 0.0000E+00 |
| R2* | −1.0000E+01 | −1.1986E−06 | 1.1815E−09 | 0.0000E+00 | 0.0000E+00 |
| R3* | −8.3403E+00 | −9.0970E−07 | 1.1725E−11 | 0.0000E+00 | 0.0000E+00 |
| R4* | −1.6497E+02 | 5.3440E−07 | −2.1346E−11 | 0.0000E+00 | 0.0000E+00 |

| optical surface | Kx, Conic Coefficient | 4th Order Coefficient (AP) | 6th Order Coefficient (BP) | 8th Order Coefficient (CP) | 10th Order Coefficient (DP) |
|---|---|---|---|---|---|
| R1* | 3.9016E+02 | 1.8352E+00 | 0.0000E+00 | 0.0000E+00 | 0.0000E+00 |
| R2* | −1.5303E+00 | 4.6916E−01 | 0.0000E+00 | 0.0000E+00 | 0.0000E+00 |
| R3* | −1.0000E+01 | −1.1991E−01 | 0.0000E+00 | 0.0000E+00 | 0.0000E+00 |
| R4* | −1.9312E+02 | 5.5557E−01 | 0.0000E+00 | 0.0000E+00 | 0.0000E+00 |

TABLE 20

Maximum Diameter of Spots of Gaussian Beam on a Drum for Fifth Preferred Embodiment

| Y | −107.463 | −95.538 | −83.553 | −95.538 | −59.670 | −47.760 | −35.843 | −23.909 | 0.000 |
|---|---|---|---|---|---|---|---|---|---|
| Max diameter | 1.05E−02 | 7.75E−03 | 8.24E−03 | 4.61E−03 | 3.44E−03 | 1.06E−02 | 1.57E−02 | 1.70E−02 | 1.47E−02 |

In summation of the description above, the present invention can achieve the following effects:

(1) With the two-element fθ lens of the invention, the interval between of spots on the image side of the MEMS reflecting mirror having a simple harmonic movement increased or decreased with time and varied with the non-constant speed scanning phenomenon, and the scanning is corrected to a constant speed scanning, so that the laser beam at the image side is projected for a constant speed scanning and an equal interval between two adjacent spots can be achieved for forming the image on a target.

(2) With the two-element fθ lens of the invention, the distortion correction is provided for correcting the scan lights in the main scanning direction and sub scanning direction, so that the spots of the image focused at the target become smaller.

(3) With the two-element fθ lens of the invention, the distortion correction is provided for correcting the scan lights in the main scanning direction and the sub scanning direction of, so that the spot size of the image on the target can be uniformized.

While the invention has been described by means of specific embodiments, numerous modifications and variations could be made by those skilled in the art without departing from the scope and spirit of the invention set forth in the claims.

What is claimed is:

1. A two-element fθ lens used for a micro-electro mechanical system (MEMS) laser scanning unit, said MEMS laser scanning unit comprising a light source for emitting laser beam, a MEMS reflecting mirror for reflecting said laser beam emitted by said light source into a scanning light by resonant oscillation, and a target provided for sensing light, said two-element fθ lens being disposed between said target and said MEMS reflecting mirror, said two-element fθ lens comprising:

a first lens, in a bi-convex shape; and a second lens, in a bi-convex shape, located between said first lens and said target;

wherein, said first lens included a first optical surface and a second optical surface, at least one of said optical surfaces is an aspherical surface in both main scanning direction and sub scanning direction of said MEMS laser scanning unit;

wherein, said second lens included a third optical surface and a fourth optical surface, at least one of said optical surfaces is an aspherical surface in both main scanning direction and sub scanning direction of said MEMS laser scanning unit;

wherein, said two-element fθ lens converts the non-linear relation of reflecting angle with time of said scanning light into a linear relation between the distance of the scan spot with time and focusing the scanning light to form an image at said target.

2. The two-element fθ lens of claim 1, wherein the main scanning direction satisfies the conditions of:

$$0.5 < \frac{d_3 + d_4 + d_5}{f_{(1)Y}} < 0.9; \text{ and}$$

$$0.2 < \frac{d_5}{f_{(2)Y}} < 0.6;$$

wherein, $f_{(1)Y}$ is the focal length of the first lens in the main scanning direction, and $f_{(2)Y}$ is the focal length of the second lens in the main scanning direction, and $d_3$ is the distance from the second optical surface to the third optical surface on the optical axis Z, and $d_4$ is the thickness of the second lens along the optical axis Z, and $d_5$ is the distance from the fourth optical surface to the target side on the optical axis Z.

3. The two-element fθ lens of claim 1, further satisfying the conditions of:

in the main scanning direction $$0.5 < \left| f_{sY} \cdot \left( \frac{(n_{d1} - 1)}{f_{(1)y}} + \frac{(n_{d2} - 1)}{f_{(2)y}} \right) \right| < 0.8;$$

and in the sub scanning direction $$0.086 < \left| \left( \frac{1}{R_{1x}} - \frac{1}{R_{2x}} \right) + \left( \frac{1}{R_{3x}} - \frac{1}{R_{4x}} \right) f_{sX} \right| < 1.0;$$

wherein, $f_{(1)Y}$ and $f_{(1)X}$ are the focal lengths of the first lens in the main scanning direction and the sub scanning direction respectively, and $f_{(2)Y}$ and $f_{(2)X}$ are the focal lengths of the second lens in the main scanning direction and the sub scanning direction respectively, $f_s$ is a combined focal length of the two-element fθ lens, and $R_{ix}$ is the radius of curvature of the i-th optical surface in the X direction; and $n_{d1}$ and $n_{d2}$ are refraction indexes of the first lens and the second lens respectively.

4. The two-element fθ lens of claim 1, wherein the ratio of the largest spot and the smallest spot size satisfies the conditions of:

$$0.4 < \delta = \frac{\min(S_b \cdot S_a)}{\max(S_b \cdot S_a)};$$

wherein, $S_a$ and $S_b$ are the lengths of any spot formed by a scan light on the target in the main scanning direction and the sub scanning direction, and δ is the ratio of the smallest spot and the largest spot on the target.

5. The two-element fθ lens of claim 1, wherein the ratio of the largest spot on the target and the smallest spot on the target satisfies the conditions of:

$$\eta_{max} = \frac{\max(S_b \cdot S_a)}{(S_{b0} \cdot S_{a0})} < 0.10; \text{ and}$$

$$\eta_{min} = \frac{\min(S_b \cdot S_a)}{(S_{b0} \cdot S_{a0})} < 0.10;$$

wherein, $S_{a0}$ and $S_{b0}$ are the lengths of a spot formed by a scan light on a reflecting surface of the MEMS reflecting mirror in the main scanning direction and the sub scanning direction, and Sa and $S_b$ are the lengths of any spot formed by a scan light on the target in the main scanning direction and the sub scanning direction, and $\eta_{max}$ is the maximum ratio value of the largest spot on the target with the spot on the reflecting surface of the MEMS reflecting mirror, and $\eta_{min}$ is the minimum ratio value of the largest spot on the target with the spot on the reflecting surface of the MEMS reflecting mirror.

* * * * *